UNITED STATES PATENT OFFICE.

HENRI LOUIS JOSEPH CHAVASSIEU, OF LYON, FRANCE.

PROCESS OF OBTAINING PROTEO-CELLULOSIC PRODUCTS.

950,435.  Specification of Letters Patent.  Patented Feb. 22, 1910.

No Drawing. Application filed December 22, 1908. Serial No. 468,722. (Specimens.)

*To all whom it may concern:*

Be it known that I, HENRI LOUIS JOSEPH CHAVASSIEU, a citizen of the French Republic, residing at Lyon, in France, have invented a certain new and useful Process of Obtaining Proteo-Cellulosic Products, of which the following is a specification.

This invention relates to a process for the dissolution and subsequent coagulation of proteids and the application of the resulting products to industrial purposes.

The process is for the purpose of obtaining new soluble and coagulable compositions of proteid substances known also as "albuminoids," and to apply these compositions to various industrial uses, and especially to those uses to which derivatives of cellulose only have been applied.

The new proteid compositions are obtained by treating proteid substances with alkalies and the alkali-albumens thus obtained with bisulfid of carbon ($CS_2$).

The process can be applied to all albuminoids (or proteids). For instance, fibrin, casein, wool waste, silk and silk waste, myosin, gut, vegetable albumens, horn, hide, leather and its waste can be treated. As an example the compositions obtained by the treatment of fibrin will be described. The fibrin is cut up and immersed for some moments in a 10% alkaline solution; it is then strained and pressed, retaining about four to five times its weight of solution. The alkali-fibrin thus obtained is cut up and submitted to the action of bisulfid of carbon for 30 to 40 minutes. During this operation the product turns yellow, and the excess of bisulfid of carbon is then removed for instance by means of a vacuum. After some time for example 8 to 15 hours the mass dissolves in the water which it contains, it being a more or less viscous solution soluble in water.

The following is an example of the proportions of the substances that may be employed: fibrin 100 parts, 10% solution of sodium hydrate 100 parts, bisulfid of carbon 20 to 30 parts.

The alkali and bisulfid of carbon are employed successively as above described.

When the proteid solutions thus obtained are allowed to stand for some days they undergo condensation, whereby they become more and more viscous and less soluble in water, finally solidifying if permitted to do so in the form of a slightly elastic and horny mass. In practice it is preferred to utilize the solutions as soon as possible after their preparation, and in any case before they commence to coagulate. If necessary the solutions may be preserved for a month or more by keeping them at a temperature between 0° and 5° C.

The above mentioned proteid solutions have the property of being coagulated and precipitated by different salts which are known to coagulate alkali-albumens. Ammonia salts such as sulfate and ferrocyanid of ammonium can be used to precipitate the solutions and said solutions are decomposed by diluted acids while regenerating a proteid substance.

The solutions treated with a solution of acetate of lead produce a red precipitate insoluble in acetic acid, which is found to be a combination of $CS_2$, protein and lead. This combination is unstable, decomposing into albumen and lead sulfid. Known xanthates, such for example as

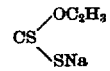

and that of phenol

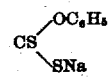

are also precipitated by acid acetate of lead while giving a combination of alcohol, sulfid of carbon and of lead in the first case and phenol, sulfid of carbon and lead in the second case. These combinations are equally unstable and are decomposed by heat into alcohol and PbS or into phenol and PbS respectively. The protein solutions may therefore be considered as proteid xanthates arising from the substitution of an atom of hydrogen of the proteid substance by the radical $CS_2Na$. It will be seen that these combinations while deriving substances differing in a high degree from cellulose have a certain resemblance in some of their properties to xanthates of cellulose or viscose. These solutions of proteid xanthates may be mixed in any proportion with solutions of cellulose xanthates to produce mixtures of proteo-cellulose-xanthates. The mixed solutions are precipitated by ammonia salts and decomposed by strong acids while regenerating a mixture of cellulose and protein.

As regards the chemical character of these products, it may be pointed out that salts of ammonium, and particularly sulfid of ammonium, in solution have the property of energetically coagulating alkaline solutions of natural proteins (milk, blood), or artificial proteins (xanthate of fibrin casein, etc.). The said solutions of sulfid of ammonium precipitate and coagulate solutions of viscose (xanthate of cellulose), and it is found that a homogeneous mixture of solutions of proteid xanthate and cellulose xanthate, treated by ammonium sulfate, yields a homogeneous coagulate of protein and cellulose. It is found that when the mixture of these solutions is treated with ammonium sulfate and dilute sulfuric acid there is obtained a product which reacts both for protein and cellulose. If for example the product, which may be in the form of a precipitate, filament, pellicle, etc., be treated by Millon's reagent (nitrate of mercury), in a heated state, it will be found to turn red, the color disappearing by subsequent boiling. It is also found that the nitrogen content of the product is substantially proportionate to the proportion of protein originally introduced into the solution. The cellulose can be distinguished by treating the filament with concentrated sulfuric acid, the resulting solution after neutralization by soda reducing Fehling's liquor.

The proteo-cellulosic-xanthate solutions can be applied to different industrial uses such as the manufacture of thread, silk, hair filaments, pellicles, molded and compressed tissues, etc. For instance, silky threads or filaments can be obtained by passing the substance through a draw plate and coagulating it in a neutral bath of sulfate of ammonia and treating the threads obtained with dilute sulfuric acid.

Other neutral salts, as for example the ammonium salts, can be used for the above purpose, as also may other strong acids as hydrochloric acid.

A combination of proteo-cellulose xanthates can thus be obtained by treating a mixture of alkali-fibrin and alkali-cellulose with bisulfid of carbon. The proportions may be as desired, a mixture containing 50 to 60% of alkali fibrin being commonly used.

The proteo-cellulosic threads obtained as above described can be subsequently subjected to the action of baths for, as it were, tanning the threads and giving them greater strength, elasticity and suppleness. For this purpose the following solutions can be employed: (a) Aqueous solutions of 2 to 5% of quinone. (b) Aqueous solutions of 2 to 5% of hydroquinone. (c) Aqueous solutions of 10 to 50 per thousand of tannin. The thread is soaked for a certain time or until impregnation is complete in these solutions and then washed and dried. The thread is immersed for some minutes, the time varying with the temperature and other conditions.

In order to impart to the thread water resisting qualities and at the same time tenacity when in the dry state, it can be treated by methods as follows: (a) Immersion in dilute baths of bichromate of potash, say three to five parts per 1000. (b) Treatment by condensing and dehydrating agents for the purpose of condensing the proteo-cellulose molecule (for example a 5% solution of formal in presence of a dehydrating agent such as acetic anhydrid diluted with crystallizable acetic acid, the preferred proportions being 95% of acetic acid to 5% of acetic anhydrid).

The proteo-cellulosic products obtained as above described are solid, elastic and tenacious, insoluble in water and in organic solvents, but soluble in concentrated sulfuric acid, forming a homogeneous viscous paste which reddens in a few hours when exposed to the air. When heated they commence to carbonize at about 200° C. and burn in air with a smell of burning horn. Submitted to the action of a 20% soda solution the product is partly dissolved with decomposition, the resulting alkaline solution having the following properties: (a) with solutions of concentrated ammonium sulfate yields a gelatinous precipitate soluble in water; (b) with strong acids in a diluted state it yields a gelatinous precipitate insoluble in water; (c) acetate of lead gives a red flaky precipitate of proteo-xanthate of lead, which upon boiling gives a black precipitate of lead sulfate mixed with protein.

What I claim as my invention and desire to secure by Letters Patent of the United States is:—

1. A process of obtaining proteo-cellulosic derivatives, consisting in submitting a protein substance to the successive action of alkalies and of bisulfid of carbon to produce a viscous solution, adding to the solution xanthate of cellulose, precipitating the solution by means of an ammonium salt, and decomposing the product thus obtained by a strong acid in a diluted state.

2. A process of obtaining proteo-cellulosic derivatives, consisting in submitting a protein substance to the successive action of alkalies and of bisulfid of carbon to produce a viscous solution, adding to the solution xanthate of cellulose, precipitating the solution by means of an ammonium salt, decomposing the product thus obtained by a strong acid in a diluted state, and submitting the product thus obtained to the action of solutions of tanning substances.

3. A process of obtaining proteo-cellulosic derivatives, consisting in submitting a protein substance to the successive action of alkalies and of bisulfid of carbon to produce a viscous solution, adding to the solution xanthate of cellulose, precipitating the solution by means of an ammonium salt, decomposing the product thus obtained by a strong acid in a diluted state, submitting the product thus obtained to the action of solutions of tanning substances and finally to the action
5 of condensing and dehydrating agents to increase the resistance and elasticity of the product.

In witness whereof I have signed this specification in the presence of two witnesses.

HENRI LOUIS JOSEPH CHAVASSIEU.

Witnesses:
JEAN GERMAIN,
GUILLAUME PIOCHE.

---

Corrections in Letters Patent No. 950,435.

It is hereby certified that in Letters Patent No. 950,435, granted February 22, 1910, upon the application of Henri Louis Joseph Chavassieu, of Lyon, France, for an improvement in "Processes of Obtaining Proteo-Cellulosic Products," errors appear in the printed specification requiring correction, as follows: Page 1, line 112, the word "sulfid" should read *sulfate;* page 2, line 5, the word "sulfid" should read *sulfate,* and same page, line 100, the word "sulfate" should read *sulfid;* and that the said Letters Patent should be read with these corrections therein that the same may conform to the record of the case in the Patent Office.

Signed and sealed this 4th day of October, A. D., 1910.

[SEAL.]

E. B. MOORE,
*Commissioner of Patents.* the product thus obtained by a strong acid in a diluted state, submitting the product thus obtained to the action of solutions of tanning substances and finally to the action of condensing and dehydrating agents to increase the resistance and elasticity of the product.

In witness whereof I have signed this specification in the presence of two witnesses.

HENRI LOUIS JOSEPH CHAVASSIEU.

Witnesses:
JEAN GERMAIN,
GUILLAUME PIOCHE.

---

Corrections in Letters Patent No. 950,435.

It is hereby certified that in Letters Patent No. 950,435, granted February 22, 1910, upon the application of Henri Louis Joseph Chavassieu, of Lyon, France, for an improvement in "Processes of Obtaining Proteo-Cellulosic Products," errors appear in the printed specification requiring correction, as follows: Page 1, line 112, the word "sulfid" should read *sulfate;* page 2, line 5, the word "sulfid" should read *sulfate*, and same page, line 100, the word "sulfate" should read *sulfid;* and that the said Letters Patent should be read with these corrections therein that the same may conform to the record of the case in the Patent Office.

Signed and sealed this 4th day of October, A. D., 1910.

[SEAL.]

E. B. MOORE,
*Commissioner of Patents.*

It is hereby certified that in Letters Patent No. 950,435, granted February 22, 1910, upon the application of Henri Louis Joseph Chavassieu, of Lyon, France, for an improvement in "Processes of Obtaining Proteo-Cellulosic Products," errors appear in the printed specification requiring correction, as follows: Page 1, line 112, the word "sulfid" should read *sulfate;* page 2, line 5, the word "sulfid" should read *sulfate*, and same page, line 100, the word "sulfate" should read *sulfid;* and that the said Letters Patent should be read with these corrections therein that the same may conform to the record of the case in the Patent Office.

Signed and sealed this 4th day of October, A. D., 1910.

[SEAL.]

E. B. MOORE,
*Commissioner of Patents.*